US012090452B2

(12) United States Patent
Zhong et al.

(10) Patent No.: US 12,090,452 B2
(45) **Date of Patent: *Sep. 17, 2024**

(54) FRACTURING FLUID MIXING EQUIPMENT

(71) Applicant: YANTAI JEREH PETROLEUM EQUIPMENT & TECHNOLOGIES CO., LTD., Yantai Shandong (CN)

(72) Inventors: Jifeng Zhong, Yantai Shandong (CN); Chuanbo Wang, Yantai Shandong (CN); Kai Wang, Yantai Shandong (CN); Yipeng Wu, Yantai Shandong (CN); Kun Zhang, Yantai Shandong (CN); Yibo Jiang, Yantai Shandong (CN)

(73) Assignee: YANTAI JEREH PETROLEUM EQUIPMENT & TECHNOLOGIES CO., LTD., Yantai Shandong (CN)

( * ) Notice: Subject to any disclaimer, the term of this patent is extended or adjusted under 35 U.S.C. 154(b) by 543 days.

This patent is subject to a terminal disclaimer.

(21) Appl. No.: 17/106,367

(22) Filed: Nov. 30, 2020

(65) Prior Publication Data

US 2021/0308638 A1 Oct. 7, 2021

Related U.S. Application Data

(63) Continuation-in-part of application No. 16/837,096, filed on Apr. 1, 2020, now Pat. No. 10,870,093.

(30) Foreign Application Priority Data

Nov. 20, 2020 (CN) ......................... 202022715306.9

(51) Int. Cl.
*B01F 3/12* (2006.01)
*B01F 5/04* (2006.01)
(Continued)

(52) U.S. Cl.
CPC .............. *B01F 23/59* (2022.01); *B01F 25/31* (2022.01); *B01F 33/5021* (2022.01);
(Continued)

(58) Field of Classification Search
CPC ..... B01F 33/5023; B01F 35/718; B01F 23/59
(Continued)

(56) References Cited

U.S. PATENT DOCUMENTS 7,794,135 B2 * 9/2010 El Kholy ................ B01F 25/10
366/173.2
8,079,750 B2 * 12/2011 Freeman ............... B01F 35/883
366/152.2
(Continued)

*Primary Examiner* — Elizabeth Insler
(74) *Attorney, Agent, or Firm* — FROST BROWN TODD LLP

(57) ABSTRACT

The present disclosure provides a fracturing fluid mixing equipment including a clear water supply system, at least two mixing systems, at least one powder tank, at least two powder conveying systems, a mixing tank, a feeding system and a power system. The clear water supply system has two parallel water supply paths which are connected to the mixing system and the mixing tank respectively. The powder conveying system is connected to the powder tank. There are same number of powder conveying systems and mixing systems which are connected in one-to-one correspondence. The mixing system is connected into the mixing tank. The feeding system adds powder by pneumatic conveying. The power system provides driving force by pure electric power and/or electro-hydraulic power. According to present disclosure, the power system can reduce fuel consumption and exhaust emissions. The feeding system can be compatible with various adding conditions of powders in different packaging, which can reduce the possibility of dust pollution, thereby reducing labor costs and occupational injuries and being more efficient and environmentally friendly.

16 Claims, 6 Drawing Sheets

(51) Int. Cl.

| | |
|---|---|
| ***B01F 13/00*** | (2006.01) |
| ***B01F 15/00*** | (2006.01) |
| ***B01F 23/50*** | (2022.01) |
| ***B01F 25/31*** | (2022.01) |
| ***B01F 33/502*** | (2022.01) |
| ***B01F 35/00*** | (2022.01) |
| ***B01F 35/21*** | (2022.01) |
| ***B01F 35/22*** | (2022.01) |
| ***B01F 35/71*** | (2022.01) |
| *B01F 101/49* | (2022.01) |
| *E21B 43/26* | (2006.01) |

(52) U.S. Cl.

CPC ...... *B01F 33/5023* (2022.01); *B01F 33/5026* (2022.01); *B01F 35/184* (2022.01); *B01F 35/2112* (2022.01); *B01F 35/2113* (2022.01); *B01F 35/2117* (2022.01); *B01F 35/2205* (2022.01); *B01F 35/2209* (2022.01); *B01F 35/718* (2022.01); *B01F 2101/49* (2022.01); *E21B 43/26* (2013.01)

(58) Field of Classification Search

USPC ............................................ 366/163.1, 163.2

See application file for complete search history.

(56) References Cited

U.S. PATENT DOCUMENTS

| | | | | |
|---|---|---|---|---|
| 9,592,479 | B2 * | 3/2017 | Lucas | B01F 23/54 |
| 10,870,093 | B1 * | 12/2020 | Zhong | B01F 35/71805 |
| 2005/0024988 | A1 * | 2/2005 | Hoff | B01F 35/881<br>366/156.2 |
| 2013/0292122 | A1 * | 11/2013 | Nichols | E21B 21/062<br>166/308.1 |
| 2017/0333928 | A1 * | 11/2017 | Chapron | B01F 25/85 |

* cited by examiner

FRACTURING FLUID MIXING EQUIPMENT

TECHNICAL FIELD

The present disclosure relates to fracturing fluid mixing equipment.

BACKGROUND

Well drilling is an indispensable process in oil exploration nowadays. Drilling fluid and flushing fluid are commonly used in drilling. At present, the two fluids are mostly prepared at fixed stations. Fracturing is a major approach to increase the production of oil and gas fields. Currently, a large amount of fracturing base fluid is required in the fracturing operations all over the world, especially on the fracturing sites of shale gas. A lot of base fluid is still prepared at fixed sites in China. The preparation sites of the two fluids occupy a large area, require a lot of staff, and are inadequately automated. Based on the above requirements, the present disclosure provides a set of multifunctional fluid formulation equipment, which can prepare a variety of fluids and is widely applicable, thereby resolving problems such as large occupied area and inadequate automation, during the fluid preparation at fixed sites. The equipment may be operated to replace the original operations at fixed sites and can be used to prepare fluid in real time at the drilling or fracturing sites. The equipment may be used to match the driving forms such as diesel drive, electro-hydraulic drive and electric drive according to various operation requirements and different matching capabilities of on-site electricity to adapt to the requirements at different well sites. The equipment has a compact structure to facilitate the delivery and transfer. Based on the foregoing characteristics, the equipment of the invention can effectively solve various problems of fluid preparation at fixed sites.

At present, the fracturing fluid mixing equipment which mixes fracturing fluid for instant use on site is becoming more widely used. Conventional fracturing fluid mixing equipment mostly uses engines such as diesel engines to provide driving force. As the size of the mixing equipment increases, the resulting exhaust gas pollution becomes more and more serious.

In addition, the powder for preparing fracturing base fluid has a variety of different packaging ways, such as packaged in small bags (usually weight 25 kg) or in ton bags (about 1 $m^3$ and weight 500 kg) or pre-filled into material transport vehicles. The existing fracturing fluid mixing equipment has a single way of adding powder, thereby unsuitable for adding powders in different packages. In addition, the operation of adding powder is prone to dust pollution.

Therefore, it is necessary to provide a fracturing fluid mixing equipment to at least partially solve the above problems.

SUMMARY

An object of the present disclosure is to provide a fracturing fluid mixing equipment.

According to one aspect, the fracturing fluid mixing equipment comprises a clear water supply system comprising two parallel water supply paths; at least two mixing systems connected in parallel each connected to one water supply path of the clear water supply system; at least one powder tank for storing powder; at least two powder conveying systems connected to the powder tank, the number of the powder conveying systems is equal to that of the mixing systems, each of the powder conveying systems being correspondingly connected to one mixing system; a mixing tank connected with the other water supply path of the clear water supply system and an output end of the at least two mixing systems; a feeding system connected to the powder tank, the feeding system being configured to convey powder from a supply source into the powder tank by means of pneumatic conveying; and a power system configured to provide driving force by pure electric power and/or electro-hydraulic power.

With this solution, the fracturing fluid mixing equipment provides driving force to each executive component with pure electric power and/or electro-hydraulic power, which can significantly reduce fuel consumption and exhaust emissions compared with traditional engine-driven equipment. The feeding system can be compatible with various adding conditions of powders in different packaging, which can reduce the possibility of dust pollution, thereby reducing labor costs and occupational injuries and being more efficient and environmentally friendly.

In one embodiment, the fracturing fluid mixing equipment further comprises a dust collecting system connected to the powder tank downstream of the powder tank in an air flow direction of a conveying airflow for further separating the powder before the conveying airflow is discharged.

With this solution, it is possible to further reduce the possibility of dust pollution since the dust collecting system can remove residual dust from airflow after powder pneumatic conveying.

In one embodiment, the dust collecting system and the powder tank are in one to one correspondence, or one dust collecting system corresponds to the at least two powder tanks, or at least two dust collecting systems correspond to one said powder tank.

With this solution, it is possible to flexibly arrange relationship between the dust collecting system and the powder tank according to actual needs. For example, one-to-one correspondence can ensure the dust collecting efficiency of the dust collecting system; one dust collecting system corresponding to the at least two powder tanks can reduce the volume of the dust collector; and at least two dust collecting systems corresponding to one said powder tank can increase the backup so that dust collection is possible even one of the dust collecting systems fails.

In one embodiment, the feeding system includes an air compressor configured to convey the powder by means of blowing under positive pressure or a vacuum pump configured to convey the powder by means of suction under negative pressure.

With this solution, it is possible to select air power source of the dust collecting system according to actual needs.

In one embodiment, the air compressor is configured to provide driving air source for a pneumatic component of the fracturing fluid mixing equipment, and/or the fracturing fluid mixing equipment further comprises a dust collecting system connected to the powder tank, wherein the air compressor is configured to provide a back-flushing air source to the dust collecting system.

With this solution, an air compressor which is used as the air power source can also be used to achieve other purposes, such as to provide a driving air source or a back-flushing air source. Thus, the use of the air compressor is maximized.

In one embodiment, a pressure sensor is provided in a conveying pipeline between the feeding system and the powder tank.

With this solution, it is possible to utilize the pressure sensor to sense the pressure in the conveying pipeline and the powder tank when the feeding system is working, and the feeding system can be controlled according to the sensed pressure to reduce the possibility of safety accidents caused by pressure deviating from an allowable range.

In one embodiment, the fracturing fluid mixing equipment further comprises an electrical control system for controlling the operation of the fracturing fluid mixing equipment, wherein the electrical control system has a remote control mode and/or a local control mode.

With this solution, the operator can select different control modes according to actual needs. The adaptability of the fracturing fluid mixing equipment is improved.

In one embodiment, the electrical control system is integrated with the power system.

With this solution, it is possible to reduce the volume and occupied space of the electrical control system, thereby making the fracturing fluid mixing equipment compact.

In one embodiment, the powder conveying systems are connected to a same one powder tank, wherein the powder tank is divided into at least two separate storage spaces which are connected to the powder conveying systems in one-to-one correspondence, or there are at least two powder tanks connected to the at least two powder conveying systems in one-to-one correspondence.

With this solution, it is possible to flexibly arrange relationship between the powder conveying systems and the powder tank according to actual needs, thereby improving the adaptability of the fracturing fluid mixing equipment.

In one embodiment, a weighing device is provided below or on top of the powder tank for weighing and displaying the weight of the powder in the powder tank.

With this solution, it is possible to monitor the weight of the powder in real time during the feeding process to avoid overflow of the volume and to adjust the amount of powder conveyed to the mixing system with high accuracy during the operation.

In one embodiment, the mixing tank is provided with a level meter for detecting liquid level in the mixing tank.

With this solution, it is possible to detect the liquid level in the mixing tank in real time and to adjust the suction volume and discharge volume according to the liquid level, such that the liquid level is as close as possible to or reaches the predetermined liquid level.

In one embodiment, the fracturing fluid mixing equipment further comprises an injection system, wherein an input end of the injection system is connected to one water supply path of the clear water supply system, and an output end of the injection system is respectively connected to an input end of each of the at least two mixing systems.

With this solution, it is possible to pressurize the water and then supply it to the mixing system, which can improve the mixing ability of water and powder.

In one embodiment, the fracturing fluid mixing equipment further comprises a discharge system connected to an output end of the mixing tank.

With this solution, it is possible to discharge the mixed fracturing fluid from the mixing tank to desired site through the discharge system.

In one embodiment, the fracturing fluid mixing equipment further comprises a carrier on which each system of the fracturing fluid mixing equipment is integrated.

With this solution, it is convenient to connect each system and to form the fracturing fluid mixing equipment as a whole for easy transport.

In one embodiment, the carrier is a semi-trailer, a skid or a truck.

With this solution, the form of the carrier is diversified, which can meet the requirements of the bearing space and capacity of the fracturing fluid mixing equipment, so as to better meet the operation requirements of the well site and improve the adaptability of the fracturing fluid mixing equipment.

In one embodiment, the power system is arranged at one end of the carrier in a length direction of the carrier.

With this solution, the power system occupies a small space.

In one embodiment, the power system, the mixing tank, the powder conveying system, and the powder tank are arranged in a length direction of the carrier successively.

With this solution, it is possible to utilize the installation space of the carrier reasonably and to connect each system easily.

BRIEF DESCRIPTION OF THE DRAWINGS

For a better understanding of these and other purposes, features, advantages and functions of the present disclosure, reference may be made to the preferred embodiments shown in the accompanying drawings. Identical reference signs in the drawings refer to the same components. It should be understood by those skilled in the art that the drawings are intended to illustrate a preferred embodiment of the present disclosure and do not have any limiting effect on the scope of the present disclosure, and that the parts are not drawn to scale.

REFERENCE SIGNS

Figure 1:
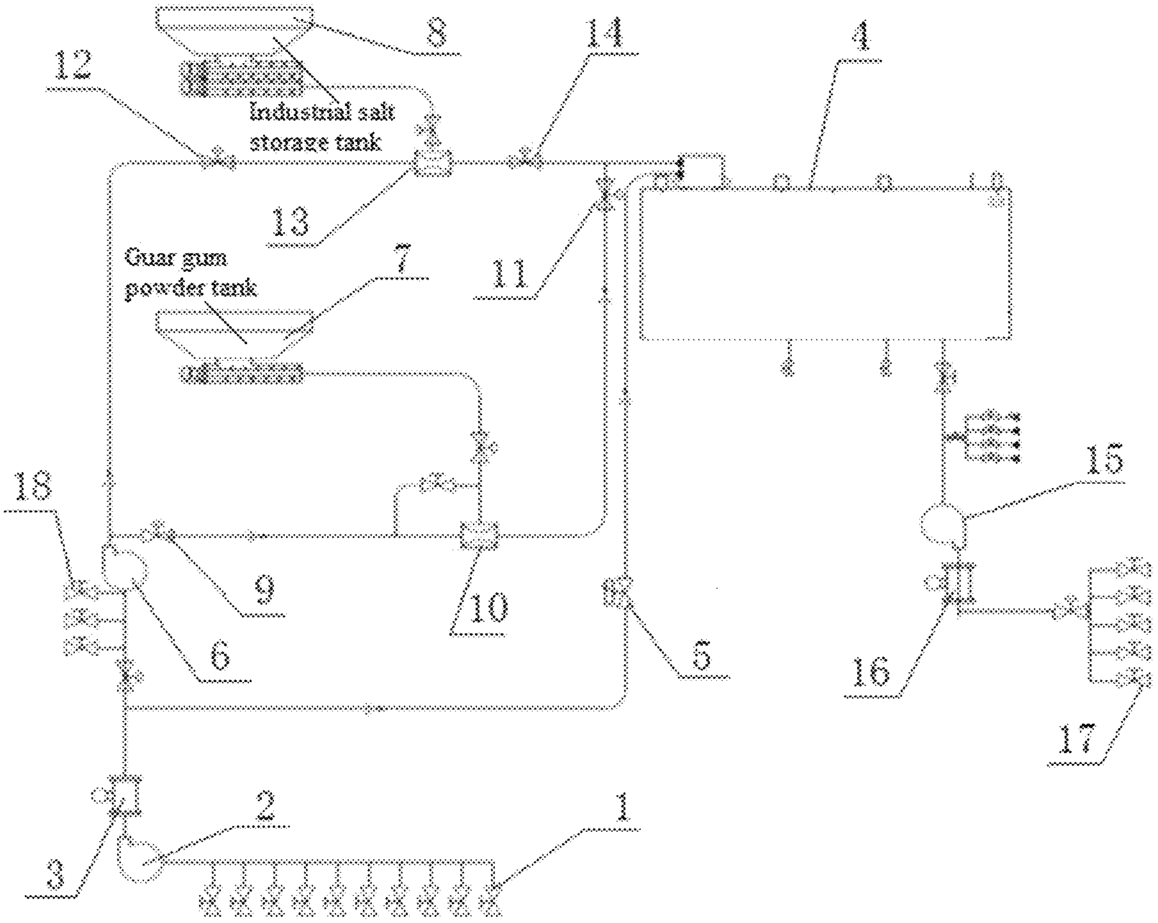
FIG. 1 illustrates a process flowchart of the fracturing fluid mixing equipment according to the present disclosure.

1 clear water valve 2 suction pump
3 flow meter 4 mixing tank
5 level control valve 6 injection pump
7 guar gum powder tank 8 industrial salt tank
9 valve 10 first mixer
11 valve 12 valve
13 second mixer 14 valve
15 discharge pump 16 flow meter
17 valve 18 replenishing valve
20 clear water supply system 21 injection system
22 mixing system 23 powder storage system
24 discharge system 25 electrical control system
26 feeding system 27 feeding manifold
28 dust collecting system 29 level meter
30 power system 31 carrier
261 air compressor 262 vacuum pump
32 powder source 33 guar gum conveying system
34 industrial salt conveying system 35 powder tank

41 guar gum mixing system 42 industrial salt mixing system

DESCRIPTION OF THE EMBODIMENTS

Now referring to the drawings, embodiments of the present disclosure will be described in detail. What is described here is only the preferred embodiments of the present disclosure. Those skilled in the art may envision other ways to realize the present disclosure on the basis of the preferred embodiments, which also fall within the scope of the present disclosure.

The present disclosure provides a fracturing fluid mixing equipment. The following is a detailed description of the fracturing fluid mixing equipment according to the present disclosure with reference to the accompanying drawings.

As shown in FIGS. 1-4, fracturing fluid mixing equipment includes a clear water supply system 20, an injection system 21, more than two mixing systems 22, more than two powder conveying systems 23, a powder tank 35, a mixing tank 4, a discharge system 24, and an electrical control system 25. One path of the clear water supply system 20 is piped into the mixing tank 4, and another path of the clear water supply system 20 is connected to an input end of the injection system 21. An output end of the injection system 21 is connected in parallel with more than two mixing systems 22. The powder tanks 35 are used to store powder material. The number of the powder conveying systems 23 is equal to that of the mixing systems 22. Each powder conveying system 23 is correspondingly connected to one mixing system 22. Moreover, the powder conveying systems 23 are also connected with the powder tanks 35, so as to convey powder from the powder tanks 35 to the mixing systems 22. Output ends of the more than two mixing systems 22 are all connected into the mixing tank 4. Preferably, the output ends of more than two mixing systems 22 are connected into one or several of T-Cock, diffusion chamber, swirler, static mixer and ejector for mixing and then into the mixing tank 4. An output end of the mixing tank 4 is connected to the discharge system 24. The clear water supply system 20, the injection system 21, the mixing systems 22, the powder conveying systems 23, the mixing tank 4, and the discharge system 24 are controlled by the electrical control system 25, and are driven electrically or/and electro-hydraulically, which can adequately meet the electrical requirements of operation equipment at the well sites. Compared with the traditional equipment driven by engine, the electric drive equipment reduces fuel consumption and exhaust emission, thereby being more energy efficient and environmentally friendly. Multiple mixing systems and the powder conveying systems corresponding to the mixing systems can meet the requirements of various mixing processes. Valves are provided at each of the input and output ends of the mixers in each mixing system. The mixing system can be specifically switched on and off by adjusting the valves at the input and output ends.

According to the conditions of materials, necessary pretreatment equipments can be arranged in the powder conveying system 23, such as a crusher for large granular salts configured to crush large-size materials into small-size materials, to facilitate the subsequent mixing process.

When mixing different powder materials, corresponding metering devices may be set for different powder to be added. For example, the conveyed amount can be measured by rotational speed, or can be measured with the assistance of an electronic scale.

The clear water supply system 20 includes multiple clear water valves 1, a suction pump 2, and a flow meter 3. The clear water valves 1, the suction pump 2, and the flow meter 3 are connected successively and then connected into the mixing tank 4 and the injection system 21 respectively. There are multiple clear water valves 1 to meet the requirement of rapidly conveying clear water during mixing. The level control valve 5 arranged on the pipeline and directly connected to the mixing tank 4 can control the conveying amount of clear water.

The injection system 21 includes an inlet valve and an injection pump 6. The inlet valve is used to control the on and off of the injection system and is connected with the injection pump 6 in series.

The fracturing fluid mixing equipment further includes one or more replenishing valves 18. The replenishing valves 18 are connected in parallel with the clear water supply system 20. The replenishing valves 18 are connected to the injection pump 6.

The powder conveying system 23 includes a guar gum powder conveying system 33, an industrial salt conveying system 34, and the like, to meet the operation requirements on the preparation of fracturing fluid, workover fluid, and flushing fluid at well sites.

The mixing systems 22 include a guar gum mixing system 41, an industrial salt mixing system 42, and the like. The guar gum powder conveying system 33 is connected to the guar gum mixing system 41. The industrial salt mixing system 42 is connected to the industrial salt conveying system 34. The guar gum mixing system 41 includes a valve 9, a first mixer 10, and a valve 11. The valve 9, the first mixer 10, and the valve 11 are connected successively. The valve 9 is connected to the injection pump 6. The valve 11 is connected to the mixing tank 4. The industrial salt mixing system 42 includes a valve 12, a second mixer 13, and a valve 14. The valve 12 is connected to the injection pump 6. The valve 14 is connected to the mixing tank 4. The type of the first mixer 10 and the second mixer 13 is set according to the properties of powder added to increase the compatibility between the mixer and the powder so as to mix the powder more adequately.

The discharge system 24 includes a discharge pump 15, a flow meter 16, and multiple valves 17. The discharge pump 15, the flow meter 16, and the valves 17 are connected successively.

The electrical control system 25 includes a frequency conversion cabinet and a control cabinet.

The fracturing fluid mixing equipment further includes a liquid additive system. The liquid additive system is connected to the suction pump 2 or the discharge pump 15. When liquid ingredients need to be added, they are added via the liquid additive system.

Embodiment 1: Individual mixing of one ingredient. For example, for mixing guar gum fluid, the clear water source is connected with the clear water valves 1. The industrial salt conveying system 34, the valve 12, the second mixer 13, the valve 14, and the replenishing valves 18 are all switched off, keeping other components of the equipment in working state. One path of the clear water enters the mixing tank 4 through the level control valve 5, and another path of the clear water enters the first mixer 10 through the injection pump 6. The powder is conveyed through the guar gum powder conveying system 33 and mixed in the first mixer 10. The mixed fluid is conveyed into the mixing tank 4 for further mixing and is finally discharged through the discharge pump 15, the flow meter 16, and the valves 17.

Embodiment 2: Simultaneous mixing of various ingredients. For example, for simultaneous mixing guar gum powder and industrial salt, compared with Embodiment 1, the industrial salt conveying system 34, the valve 12, the second mixer 13, and the valve 14 are all switched on to keep normal working. Clear water is injected by the injection pump 6 into the first mixer 10 and the second mixer 13 respectively and premixed with the powder added by the respective guar gum powder conveying system 33 and industrial salt conveying system 34. The mixed fluid flow into the mixing tank 4 together for further mixing, and then discharged through the discharge system 24.

Alternatively, the valves (the valve 9, the valve 11, the valve 12, and the valve 14) at both ends of the first mixer 10 and the second mixer 13 are all removed. The mixing mode is controlled by whether powder is added to the corresponding mixer by the powder conveying system (individual mixing or mixing more than two kinds of powder). For example, when individually mixing the guar gum, it is only necessary to convey the powder into the system through the guar gum conveying system 33, in which other parts of the mixing systems only convey the clear water.

In the condition that the suction centrifugal pump is in working state, if different liquid needs to be additionally added by the equipment, the liquid may be added through the replenishing valve before the injection system 21. When the suction centrifugal pump is not working, the valve between the injection system 21 and the suction pump can be switched off, so that the injection system 21 can run separately to meet small-flow recycle mixing, thereby reducing the power consumption of the equipment.

In real-time mixing, the inlet and outlet ends of the fracturing fluid mixing equipment are connected to corresponding upstream and downstream equipment. In batch mixing, the inlet and outlet ends of the fracturing fluid mixing equipment are connected to the storage tank to implement the circulation of mixed fluid.

Figure 2:
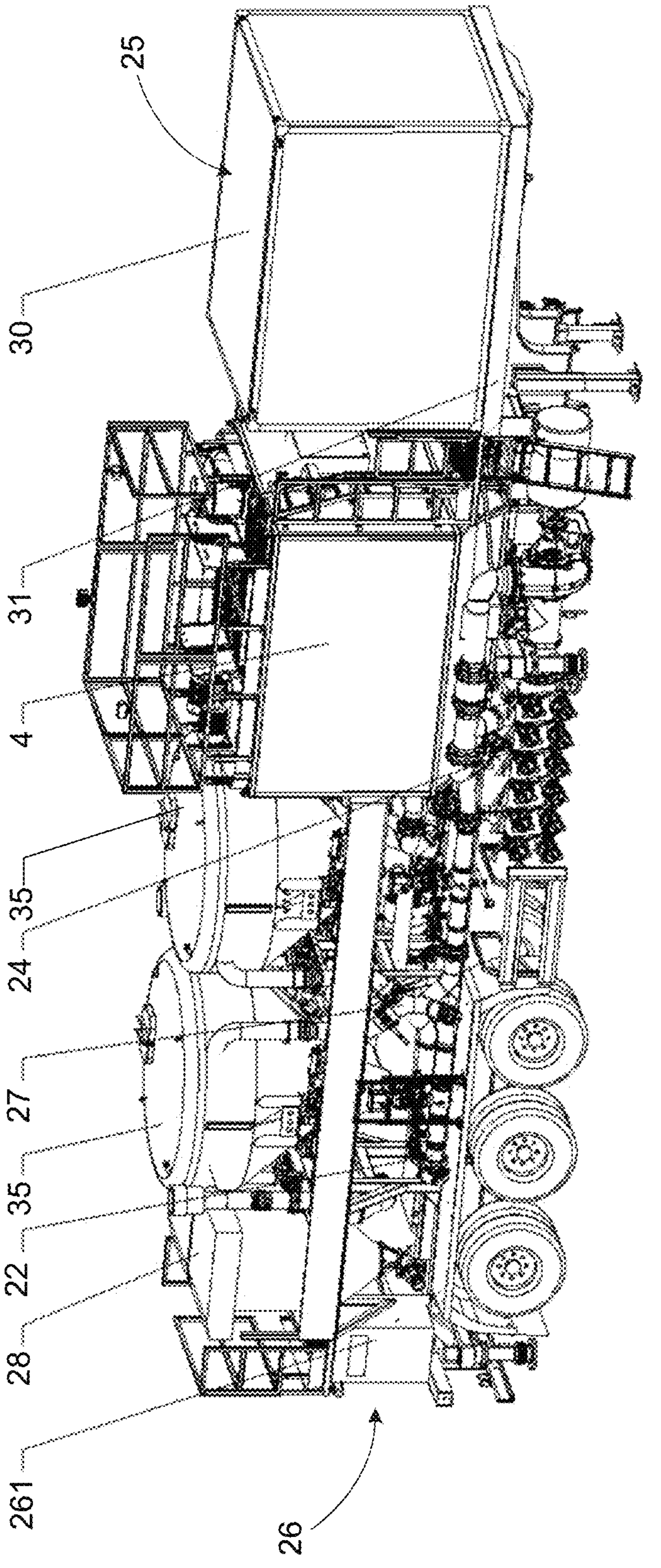
FIG. 2 illustrates a perspective view of one preferred embodiment of the fracturing fluid mixing equipment according to the present disclosure.
Figure 3:
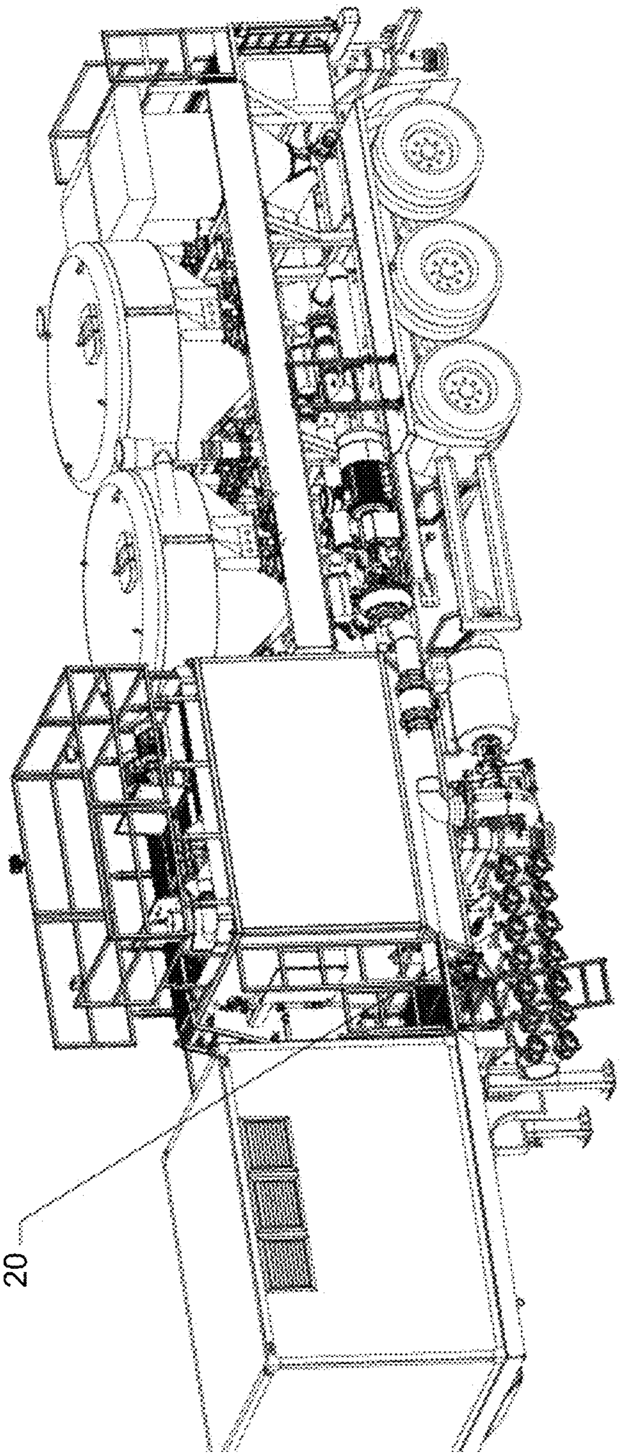
FIG. 3 illustrates another perspective view of the fracturing fluid mixing equipment shown in FIG. 2.
Figure 4:
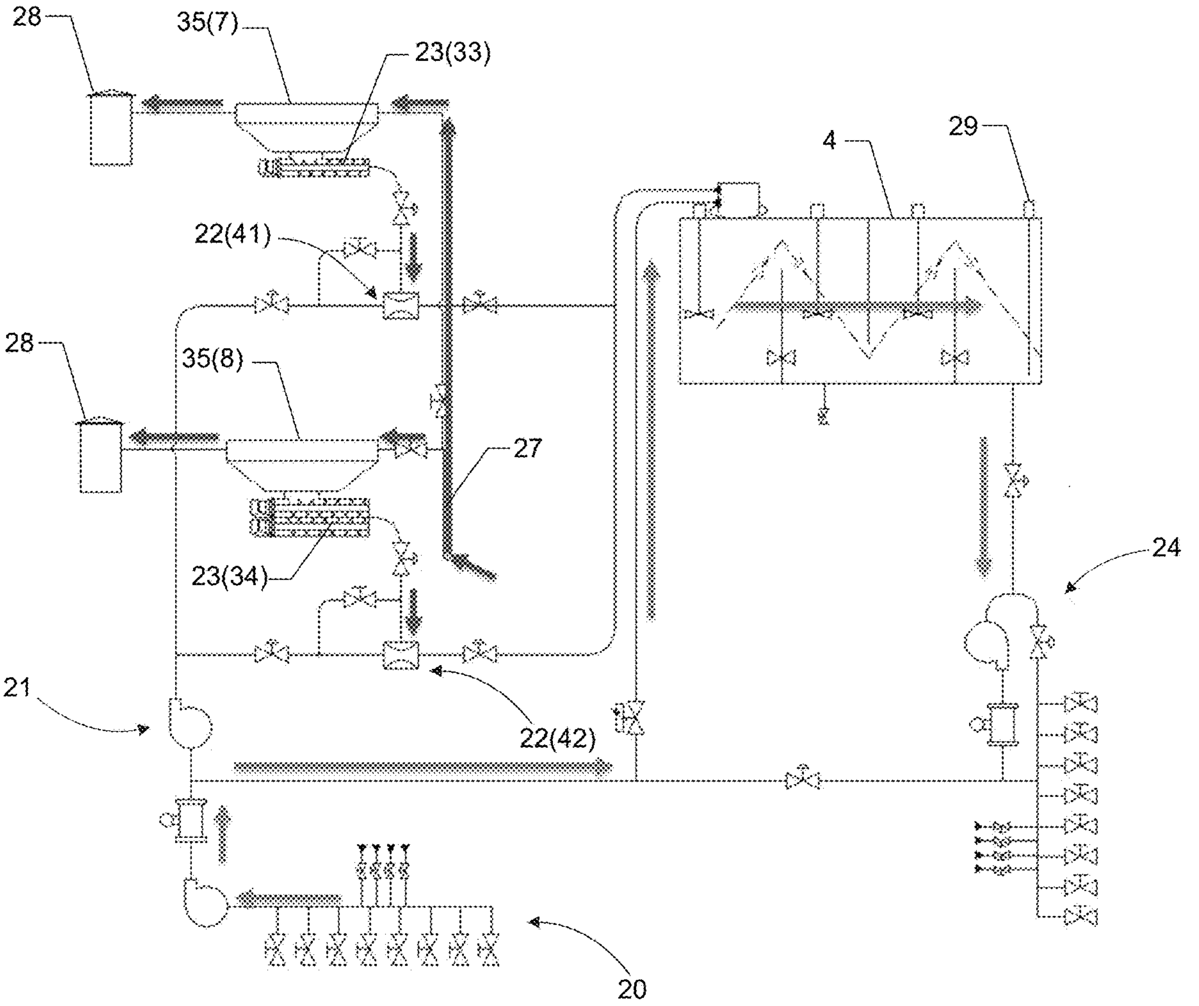
FIG. 4 illustrates another process flowchart of the fracturing fluid mixing equipment according to the present disclosure, showing a feeding system and a dust collecting system.

As shown in FIG. 2, corresponding to the powder conveying systems 23, two powder tanks 35 are provided. Each powder tank forms a separate storage space. Guar gum powder may be stored in one powder tank which can be referred to as guar gum powder tank 7, the guar gum powder tank 7 being connected to the guar gum powder conveying system 33. Industrial salt may be stored in the other powder tank which can be referred to as industrial salt tank 8, the industrial salt tank 8 being connected to the industrial salt conveying system 34.

As an alternative, there may be provided only one powder tank which is divided into two separate storage spaces to store guar gum powder and industrial salt respectively. The storage spaces are connected to the powder conveying system 23 in one-to-one correspondence. That is, one powder tank may correspondingly connect to two, three or more powder conveying systems 23. Therefore, the number of powder tanks does not necessarily correspond to the number of powder conveying systems, as long as the storage spaces correspond to the powder conveying systems.

Also, in the above description, two powder tanks 35 are used to store different powders. However, it is understood that the two powder tanks 35 may be used to store the same powder at the same time. In this way, the two mixing systems 22 can be used to mix the same fluid simultaneously, thereby improving the mixing efficiency.

Further, the fracturing fluid mixing equipment includes a feeding system 26 for adding powder to a powder tank 35. According to the present disclosure, the feeding system 26 is configured to convey the powder to the powder tank 35 by means of pneumatic conveying, which is suitable for adding powder packaged in different ways, such as packaged in small bags or in ton bags or pre-filled into the material transport vehicles, thereby reducing dust pollution caused by adding powder manually to some extent.

Referring again to FIG. 2, the fracturing fluid mixing equipment may preferably include a feeding manifold 27, an outlet end of which is connected to the power tank 35. When powder is to be added, the inlet end of the feeding manifold 27 can be connected to the package containing the powder, and the feeding system 26 then generates a conveying airflow. The powder in the package is carried by the conveying airflow and enters the powder tank 35 through the feeding manifold 27. In the powder tank 35, the conveying airflow is separated from the powder. The powder remains in the powder tank 35, and the conveying airflow is discharged through an air outlet port which may be disposed near the center on the top of the powder tank 35. The air inlet port of the powder tank 35 that is connected to the feeding manifold 27 may be disposed on the side of the powder tank 35.

Preferably, in the illustrated embodiment, the feeding manifold 27 may comprise an inlet end and at least two outlet ends, each of the at least two outlet ends being connected to each of the powder tanks 35. Each branch of the feeding manifold 27 connected to the powder tank 35 is provided with a valve to open and close the branch. By such arrangement, it is possible to add the same powder simultaneously or alternately, or add different powders, such that the fracturing fluid mixing equipment is more flexible to meet the actual needs of well site mixture.

The electronic scale described above also weighs the powder during adding and displays the weighing results in real time. The operator can be informed visually of the current amount of powder in the powder tank 35, so as to avoid powder overflowing from the power tank 35 due to excessively adding. The electronic scale can be disposed underneath or on top of the powder tank.

Generally, the conveying airflow exhausted from the air outlet port of the power tank 35 still carries a small amount of powder. The fracturing fluid mixing equipment further includes a dust collecting system 28, which includes a dust collector. The dust collector may be communicated to the powder tank 35 through the air outlet port. In other words, the dust collecting system 28 is located downstream of the powder tank 35 in the air flow direction. The conveying airflow containing a small amount of powder is exhausted from the powder tank 35 and enters the dust collector, where a secondary separation of air and powder is achieved. The air that has been de-dusted can be then discharged into the atmosphere. The dust collecting system 28 can greatly reduce the possibility of dust pollution during the addition of powder.

Depending on the air supply device, the feeding system 26 may pneumatically convey the powder under positive pressure or negative pressure. For example, when the air supply device is an air compressor, the feeding system 26 is configured to convey the powder by mean of blowing under positive pressure. In addition, the air compressor may also be used as a drive air source for the pneumatic components of the fracturing fluid mixing equipment or as a back-flushing air source for the dust collector.

Figure 5:
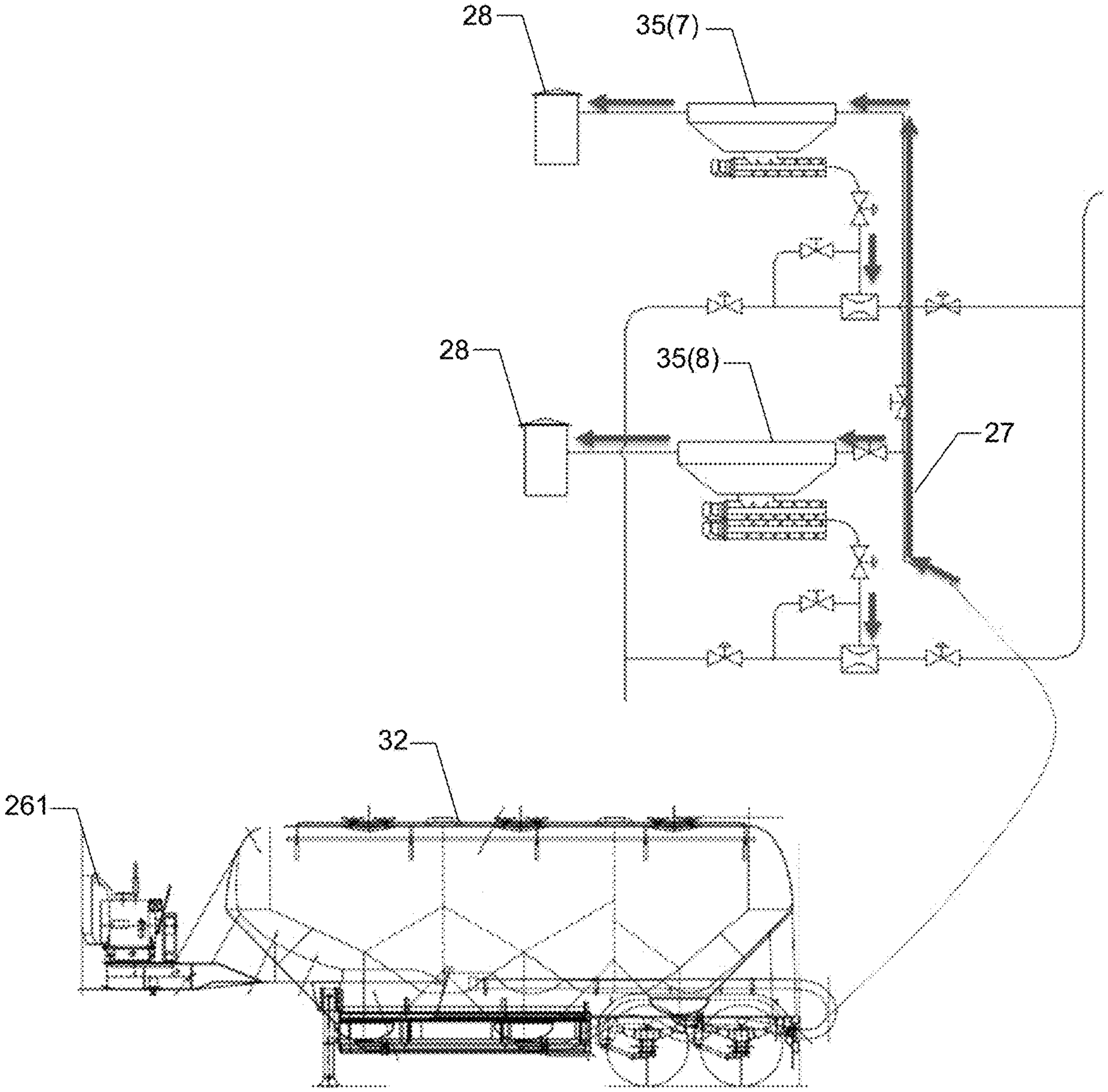
FIG. 5 illustrates a process flowchart of the fracturing fluid mixing equipment according to the present disclosure, wherein the powder is added in positive pressure.

FIG. 2 shows an air compressor 261 as the air supply device. FIG. 5 shows a process flowchart of conveying powder under positive pressure. The air compressor 261 is positioned upstream of the powder tank 35 in the air flow direction. Specifically, the air compressor 216 is connected to the powder source 32 which is then connected to the powder tank 35 through the feeding manifold 27. The powder is carried and blew into the powder tank 35 from the powder source 32 by compressed air. In FIG. 5, the powder source 32 is a storage tank such as an ash tank or a cutting tank, a vertical ash tank, etc. It will be appreciated that, in order to achieve positive pressure pneumatic conveying, storage tanks such as ash or cutting tank, vertical ash tank can withstand high air pressure with internal fluidizing components (e.g. fluidized bed) provided therein so that the powder can be suspended and moved with the air flow when aerated. The air compressor 261 may be fixed as part of the fracturing fluid mixing equipment. While the storage tank such as the ash tank or the cutting tank, vertical ash tank may be transported by means of a carrier to and from the well site to transport the powder. Alternatively, the air compressor may be located on the carrier with the storage tank.

Figure 6:
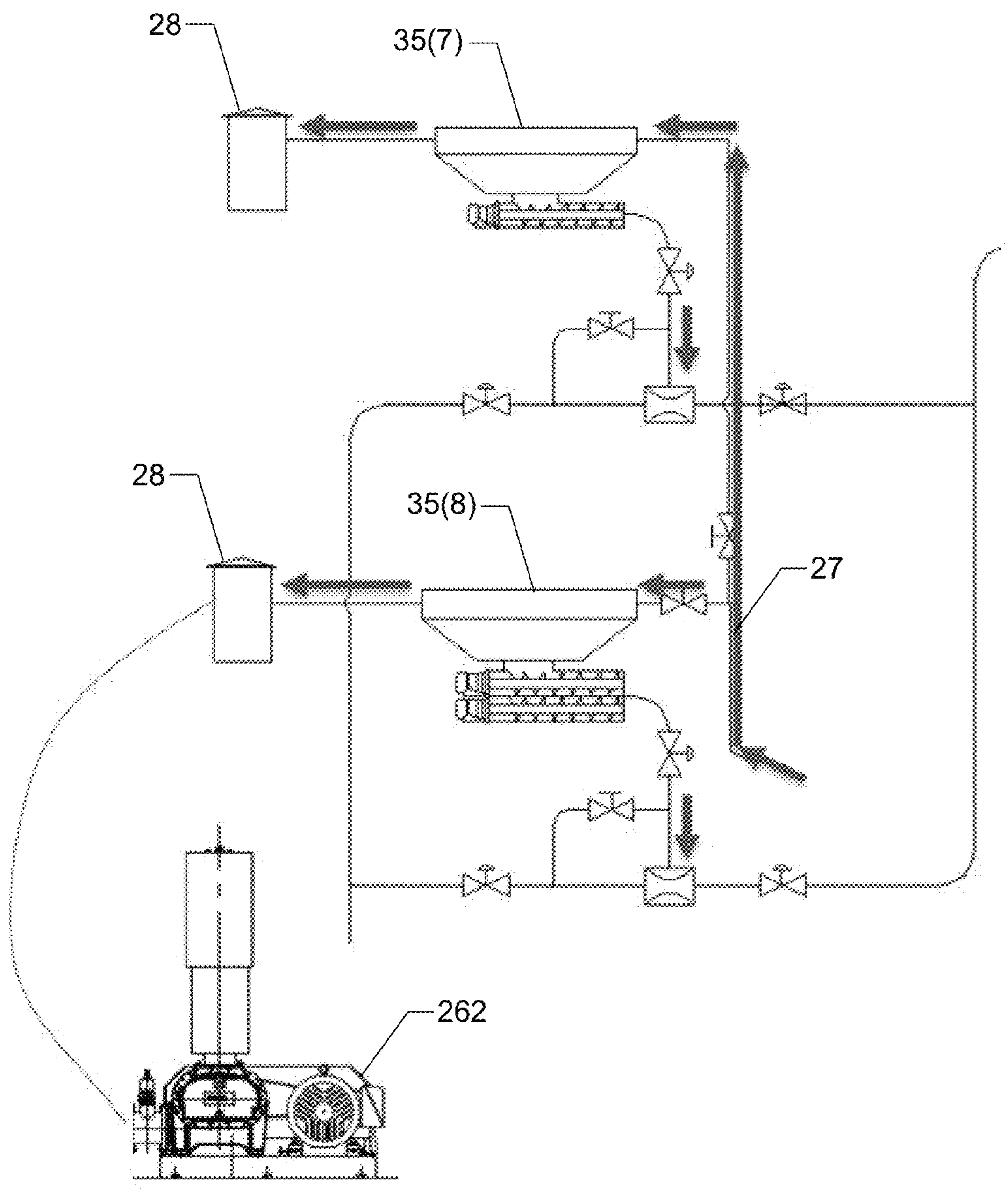
FIG. 6 illustrates a process flowchart of the fracturing fluid mixing equipment according to the present disclosure, wherein the powder is added in negative pressure.

When the air supply device is a vacuum pump, the feeding system 26 is configured to convey the powder by means of suction under negative pressure. In this case, the vacuum pump is positioned downstream of the powder tank 35 in the air flow direction, and more specifically, downstream of the dust collecting system 28. FIG. 6 shows a process flowchart for conveying the powder under negative pressure, wherein the powder source is omitted. During the addition of the powder, the powder tank 35 is connected to the powder source via the feeding manifold 27, and the vacuum pump 262 is connected to the powder tank 35 via the dust collecting system 28. The vacuum pump 262 generates negative pressure environment during operation and conveys the powder from the powder source to the powder tank 35 by means of suction.

A pressure sensor may be further provided to sense the pressure in the feeding manifold 27 or the powder tank 35 when the powder is pneumatically conveyed. The pressure sensor may be electrically connected to the electrical control system 25. When the pressure in the feeding manifold 27 or the powder tank 35 deviates from the permitted predetermined range (especially when the powder is blown under positive pressure), the electrical control system 25 can control the corresponding valve to open so as to achieve pressure relief or control the air compressor to stop working, and meanwhile generate an alarm message to warn the operator, thereby avoiding safety accidents. In addition, preferably, a valve or device with a pressure relief function such as a safety valve or a breathing valve or a rupture disc can be installed on the powder tank. When the pressure deviates from the permitted predetermined range, the safety valve or breathing valve opens to relieve the pressure, or the rupture disc ruptures to relieve the pressure.

Preferably, the mixing tank 4 may be provided with a level meter 29 for detecting the liquid level. The level meter 29 may be electrically connected to the electrical control system 25 to transmit the liquid level signal. The electrical control system 25 may adjust the suction pump 2, the level control valve 5, or the discharge pump 15 depending on the liquid level, so that the liquid level in the mixing tank 4 is close to or reaches a predetermined level value as far as possible.

As described above, according to the present disclosure, the power system 30 of the fracturing fluid mixing equipment is configured to provide the driving force electrically and/or electro-hydraulically. In this way, the fracturing fluid mixing equipment according to the present disclosure can better meet the need for electrification of the well site operation equipment, and can significantly reduce fuel consumption and exhaust emissions compared to the conventional engine driven fracturing fluid mixing equipment.

When driven by pure electric power, the accessories of the power system 30 may include transformers, variable-frequency drive, and power distribution switches. When driven by electro-hydraulic power, the accessories of the power system 30 may include an electric motor or a motor with a controller or an inverter-equipped motor, a transfer case, a hydraulic pump, a hydraulic motor (mounted on the corresponding actuators), etc.

Preferably, in embodiment in which pure electric power is used, a power supply room including a distribution switch, a transformer, and a variable-frequency drive may be provided, in which the electrical control system 25 may be integrated with these components. Whereas in embodiment in which electro-hydraulic power is used, the electrical control system comprises a separate control cabinet which may be located close to the motor and hydraulic system of the power system 30. Further, the electrical control system 25 may have a local control mode and/or a remote control mode. In the remote control mode, the fracturing fluid mixing equipment may be controlled by a controller located in another facility or located in site via wired or wireless connection. The various control modes may enhance the adaptability of the fracturing fluid mixing equipment.

Further, as shown in FIG. 2, the fracturing fluid mixing equipment also includes a carrier 31 on which each of the above-mentioned systems and actuating components are integrated. Such an arrangement may facilitate the interconnection of the system on the one hand and make the fracturing fluid mixing equipment form a whole which is conveniently transported between different sites. Preferably, the carrier 31 may be an unpowered semi-trailer or trailer, a self-powered truck, or a skid, etc. The semi-trailer-loaded or skid-mounted or vehicle-loaded form can meet the load space and load capacity requirements of the fracturing fluid mixing equipment. The various forms of the carrier 31 can better meet the operational needs of the well site and improve the adaptability of the fracturing fluid mixing equipment.

Preferably, when integrated on the carrier 31, the power system 30, the mixing tank 4, the powder conveying system 23, the powder tank 35 and the dust collecting system 28 are successive from one end to the other along the length of the carrier 31. The clear water supply system 20 and the discharge system 24 are respectively arranged on the two sides of the mixing tank 4. The injection system 21 and the mixing systems 22 are arranged below the powder tank 35. The feeding manifold 27 is arranged on one side of the powder tank 35.

Wherein, the power system 30 is provided at the end of the carrier 31 along the length direction. Taking the electro-hydraulic drive as an example, when the carrier 31 is a semi-trailer, the motor, the transfer case and the hydraulic pump are integrated on the gooseneck of the semi-trailer, and the hydraulic motor is provided at the corresponding position of each driving element of the fracturing fluid mixing equipment. When the carrier 31 is a skid, the motor (or the motor with a controller), the transfer case and the hydraulic pump of the accessories of electro-hydraulically drive are integrated at one end of the skid.

The fracturing fluid mixing equipment according to the present disclosure provides driving force by pure electric power and/or by electro-hydraulic power for the executive components, which can significantly reduce fuel consumption and exhaust emission, thereby being energy saving and environmental friendly. The pneumatic conveying feeding system with a dust collecting system makes the fracturing fluid mixing equipment compatible with various adding conditions of powders in different packaging, and can reduce the possibility of dust pollution caused by manually adding powder, thereby reducing labor costs and occupational injuries, and being more efficient and environmentally friendly.

The foregoing description of the various embodiments of the present disclosure is provided for the purpose of description to a person skilled in the related art. It is not intended to exclude or limit the present disclosure to a single disclosed embodiment. As above, those of ordinary skill in the art taught above will understand many alternatives and modifications of the present disclosure. Therefore, although some alternative embodiments are specifically described, those skilled in the art will understand or develop other embodiments with relative ease. The present disclosure is intended to include all the alternatives, modifications and variations of the present disclosure described herein, as well as other embodiments falling within the spirit and scope of the present disclosure described above.

What is claimed is:

1. A fracturing fluid mixing equipment, comprising:

(a) a clear water supply system comprising two parallel water supply paths;

(b) at least two mixing systems connected in parallel, each connected to one water supply path of the clear water supply system;

(c) at least one powder tank for storing powder;

(d) at least two powder conveying systems connected to the at least one powder tank, the number of the powder conveying systems being equal to that of the mixing systems, each of the powder conveying systems being correspondingly connected to one mixing system;

(e) a mixing tank connected with the other water supply path of the clear water supply system and an output end of the at least two mixing systems;

(f) a feeding system connected to the at least one powder tank, the feeding system being configured to convey powder from a supply source into the at least one powder tank by means of pneumatic conveying, wherein the feeding system includes an air compressor configured to convey the powder into the at least one powder tank by means of blowing under positive pressure, wherein the air compressor is configured to provide driving air source for a pneumatic component of the fracturing fluid mixing equipment, wherein the fracturing fluid mixing equipment further comprises a dust collecting system connected to the at least one powder tank, the air compressor being configured to provide a back-flushing air source past the at least one powder tank and to the dust collecting system positioned downstream from the at least one powder tank; and (g) a power system configured to provide driving force by pure electric power and/or electro-hydraulic power.

2. The fracturing fluid mixing equipment according to claim 1, the dust collecting system being downstream of the at least one powder tank in an air flow direction of a conveying airflow for further separating the powder before the conveying airflow is discharged.

3. The fracturing fluid mixing equipment according to claim 2, wherein the dust collecting system and the at least one powder tank are in one to one correspondence, or one dust collecting system corresponds to two powder tanks of the at least one powder tank, or at least two dust collecting systems correspond to the at least one powder tank.

4. The fracturing fluid mixing equipment according to claim 1, wherein a pressure sensor is provided in a conveying pipeline between the feeding system and the at least one powder tank.

5. The fracturing fluid mixing equipment according to claim 1 further comprising an electrical control system for controlling the operation of the fracturing fluid mixing equipment, the electrical control system having a remote control mode and/or a local control mode.

6. The fracturing fluid mixing equipment according to claim 5, wherein the electrical control system is integrated with the power system.

7. The fracturing fluid mixing equipment according to claim 1, wherein the at least two powder conveying systems are connected to one and same powder tank of the at least one powder tank, wherein the one powder tank of the at least one powder tank is divided into at least two separate storage spaces which are connected to the powder conveying systems in one-to-one correspondence, or there are at least two powder tanks of the at least one powder tank connected to the at least two powder conveying systems in one-to-one correspondence.

8. The fracturing fluid mixing equipment according to claim 1, wherein a weighing device is provided below or on top of the at least one powder tank for weighing and displaying the weight of the powder in the at least one powder tank.

9. The fracturing fluid mixing equipment according to claim 1, wherein the mixing tank is provided with a level meter for detecting liquid level in the mixing tank.

10. The fracturing fluid mixing equipment according to claim 1 further comprising an injection system, wherein an input end of the injection system is connected to one water supply path of the clear water supply system, and an output end of the injection system is respectively connected to an input end of each of the at least two mixing systems.

11. The fracturing fluid mixing equipment according to claim 1 further comprising a discharge system connected to an output end of the mixing tank.

12. The fracturing fluid mixing equipment according to claim 1 further comprising a carrier on which each system of the fracturing fluid mixing equipment is integrated.

13. The fracturing fluid mixing equipment according to claim 12, wherein the carrier is a semi-trailer, a skid or a truck.

14. The fracturing fluid mixing equipment according to claim 12, wherein the power system is arranged at one end of the carrier in a length direction of the carrier.

15. The fracturing fluid mixing equipment according to claim 12, wherein the power system, the mixing tank, the at least two powder conveying systems, and the at least one powder tank are arranged in a length direction of the carrier successively.

16. The fracturing fluid mixing equipment according to claim 1 further comprising an electrical control system configured to selectively output a first solution from one of the at least two mixing systems and into the mixing tank while also inhibiting output of a second solution from another of the at least two mixing systems.

* * * * *